United States Patent Office 3,481,697
Patented Dec. 2, 1969

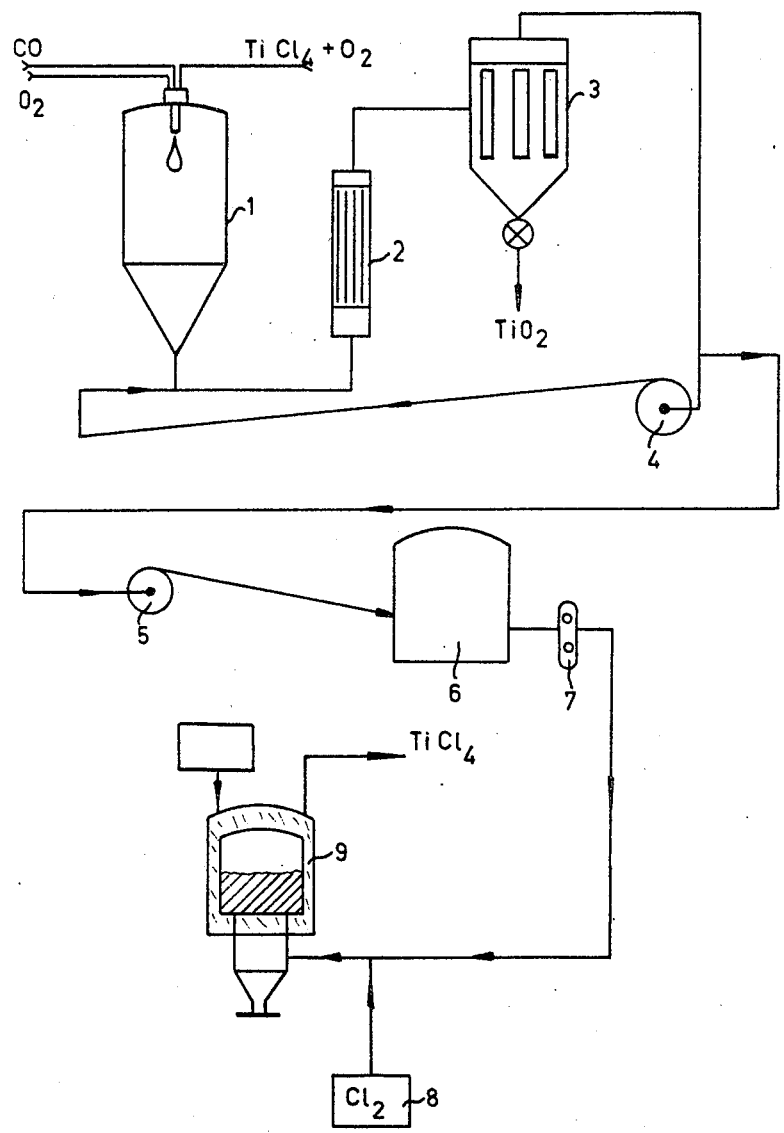

3,481,697
PROCESS FOR MAKING TITANIUM TETRACHLORIDE
Maurice Germain Figuet and Robert Jean Mas, Thann, France, assignors to Fabriques de Produits Chimiques de Thann et de Mulhouse, Thann, France
Filed July 26, 1966, Ser. No. 567,888
Claims priority, application France, Sept. 6, 1965, 30,543
Int. Cl. C01b 9/02; C01g 23/02
U.S. Cl. 23—87
2 Claims

ABSTRACT OF THE DISCLOSURE

This disclosure relates to a process for making titanium tetrachloride by chlorinating an oxide of titanium at least in part with the chlorine produced as a by-product of the oxidation of titanium tetrachloride and mixed with oxygen and oxygen-containing gases wherein there is oxidized at a high temperature a charge comprising from 40 to 150 cubic meters per hour of a mixture of carbon monoxide, carbon dioxide and nitrogen, from 20 to 80 cubic meters per hour of oxygen and from 43 to 195 cubic meters per hour of a mixture of titanium tetrachloride and oxygen, followed by cooling the oxidized charge, separating the titanium dioxide formed by the oxidation from the reaction gases, determining the chlorine content in these gases; adding sufficient pure chlorine gas to the gases within the range of 50 to 70% by volume, and feeding the gases thus enriched in chlorine to a chlorinating zone together with a reducing agent, and a titanium oxide, followed by heating the zone at a temperature ranging from 700 to 1200° C. and recovering the titanium tetrachloride so formed.

---

Titanium dioxide has many industrial applications in particular in the paint industry as a pigment, but also in the plastic industry, the printing ink industry and the paper industry.

The most commonly used process for making titanium oxide is a wet phase process. A more modern process effected in the dry phase uses titanium tetrachloride as an intermediate. This latter process takes place in two stages. First, the titanium tetrachloride is formed in a chlorinator. Next, the titanium tetrachloride is transformed into titanium oxide in an oxidizer. These steps naturally can be performed in different ways as modifications of the basic process. In the first manufacturing stage for making titanium tetrachloride, a titanium compound is treated with gaseous chlorine at a temperature of about 1000° C. and in the presence of a reducing agent. This reaction produces essentially titanium tetrachloride, carbon oxide and carbon dioxide, the titanium chloride being later condensed and purified. The starting titaniferous material can be ilmenite, rutile or ilemnite concentrates obtained in any suitable manner. The reducing agent is carbon in the form of petroleum coke, domestic coke or graphite wastes. The chlorination can be effected in a fixed bed or in a fluidised bed. The condensation of the titanium tertachloride is made either completely, or in fraction. The chemical purifying consists essentially in eliminating vanadium and is done with powdered copper, hydrogen sulphide or with a suitable organic material.

For the second phase, the gaseous purified titanium chloride is treated with oxygen at a high temperature in excess of 800° C. The tetrachloride is completely transformed into titanium dioxide and chlorine is liberated. To operate at this temperature level, there are needed additional calories. For this reason the oxygen used is either pure or diluted and various types of burners are used.

The titanium oxide is separated from the reaction gases by various precipitators. Additional calories are brought either by preheating the reactors, or by introducing the reactants in the hot gases coming from the combustion gas, for example, carbon oxide, in oxygen or in any gas containing oxygen.

Regardless of the modifications of the process employed there is found at the outlet of the oxidizer and under its gaseous elementary form, all the chlorine which has been introduced during the process with the exception, naturally, of the usual losses. For a long time attempts have been made to use this available gaseous chlorine together with fresh chlorine (corresponding to the losses) and to recycle it in the chlorinator in order to form additional quantities of titanium tetrachloride.

All these attempts have heretofore met with failure. Thus in the pre-heating process in which pure titanium tetrachloride pre-heated at 800 or 900° C. is treated with pure oxygen pre-heated at the same temperature, the reaction gases consist of chlorine which is practically pure. However, the oxidizing circuit often has air inlets which dilute the chlorine, and furthermore the oxygen which decomposes the titanium chloride is in excess which produces an additional dilution of this chlorine. If dilute oxygen is used, for reasons of economy or as a function of the quality of oxide desired, the dilution of the chlorine is further increased.

With the auxiliary flame process in which additional calories are supplied by auxiliary combustion, of for example, carbon oxide, the dilution of the chlorine is again increased since, in addition to the dilution as indicated above which also takes place in this process, the chlorine is further diluted by the carbon-dioxide formed by combustion of carbon monoxide.

According to the process employed, the oxidation gases contain from 25 to 95% of free chlorine which must be treated in special apparatus for recovering the chlorine according to various known processes. The necessity for this additional equipment constitutes an important increase in the cost price of titanium dioxide by the dry phase.

With the pre-heating process, the oxidation gases contain in addition to chlorine various inert gases and an excess of oxygen. This excess of oxygen can serve, in case of direct re-cycling of the oxidation gases to the chlorinator, to furnish a part or even all the calories necessary for this equilibrium of the chlorinator. The calories necessary for this equilibrium can be determined mathematically and it is possible to consequently provide the amount of oxygen to be added in order to effect the direct re-cycling of the oxidation gases.

The same is not the case in the auxiliary flame process since the oxidation gases contain additionally carbon dioxide. They can also contain nitrogen oxides formed in the hot zones of the zone of reaction and sulfur compounds introduced with carbon monoxide.

In order to compute the thermal balance of the chlorinator, it is necessary to know the proportions of carbon monoxide and carbon dioxide coming out of the chlorinator. However, this proportion cannot be calculated with precision since the chlorination of the titanium mineral in the presence of nitrogen and/or sulfur compounds is subject to a catalytic or activating action which is not known. In the case of chlorination in a fluidised bed, this lack of precision is further increased. The dimensions of the chlorinators used also influences the equilibrium action of carbon monoxide and carbon dioxide so that the oxidation gases cannot be recycled to the chlorinator if there is no certainty that chlorination will take place under suitable conditions. It is thus seen that it is not possible to predict the amount of oxygen which would be eventually necessary in order to equilibrate the thermal balance.

The present invention has for an object to make possible the direct recycling of oxidation gases to a chlorinator in the auxiliary flame process for making titanium dioxide.

Broadly stated, the present invention resides in the dry phase process in which titanium chloride is treated at high temperature with oxygen or gases containing oxygen and in which the additional calories necessary for maintaining the reaction are obtained by mixing the reactive gases with gases originating from the combustion of carbon monoxide in oxygen or in gases containing oxygen and wherein the gases originating from the oxidation are used directly in the making of titanium chloride without pre-treatment.

One embodiment of an apparatus for practicing the process of this invention is diagrammatically illustrated in the accompanying drawing wherein the single figure illustrates an apparatus and flow diagram for recycling chlorine gas according to the present process.

The system shown comprises an oxidizer 1 to which is fed carbon monoxide, oxygen and a mixture of titanium tetrachloride and oxygen. Suitably the oxidation reaction is carried out in this oxidizer at a temperature ranging from 900 to 1600° C. The resulting products are then cooled by means of heat exchanger 2 and sent on to a filtering unit 3 from which the titanium dioxide is removed. Recycling blower 4 is connected with oxidizer 1 and provides the pressure necessary to conduct the oxidation products to the heat exchanger. In the line coming from filter unit 1 is a tap also going to blower 4 but which is connected to another blower 5 for removing a given proportion of the gases passing through the line, which gases are then fed to a gas meter 6 for determining the chlorine contents thereof. Coming out of the gas meter, the gases are sent on to a pressure increasing unit 7 and then enough chlorine is added to the gases from the source of fresh chlorine 8 to bring the chlorine content thereof by volume to between 50 and 70%. The gases thus enriched in chlorine are fed to a chlorinator 9 together with a titanium oxide such as rutile or ilmenite and a reducing agent, such as coke or any suitable form of carbon. The chlorinator is then brought up to a temperature ranging between 700 and 1200° C. and the titanium tetrachloride thus formed is recovered. In practice there are used as many chlorinating units as there is chlorine coming from the oxidizer. Generally the chlorinator is of the fluidised bed type in which the fluidising bed has a speed ranging from 20 to 60 centimetres per second, which is a speed of the chlorine gas as it comes out of the pressure increasing device 7.

Unexpectedly in the practice of the invention, the presence of oxygen in the charge fed to the chlorinator, which normally would be considered a diluant of the chlorine and as such to be avoided in the feed charge, on the contrary results in an economically advantageous process since it burns and furnishes lost calories resulting from the reduction of the carbon dioxide to carbon monoxide.

In the practice of the invention it is necessary to use a feed charge to the oxidizer having a composition range falling within certain limits. Thus it has been found that a suitable hourly flow of reactants comprises from 40 to 150 cubic meters of a mixture of carbon monoxide, carbon dioxide and nitrogen, from 20 to 80 cubic meters of oxygen and from 43 to 195 cubic meters of a mixture of titanium tetrachloride and oxygen. The volume composition of the carbon monoxide mixtures suitable for the practice of the invention are the following: carbon monoxide 60–85%; nitrogen 5–30%, carbon dioxide 5–15%.

In one example of the invention a charge comprising 80 cubic meters per hour of a mixture consisting of 65% of carbon monoxide, 30% of nitrogen and 5% of carbon dioxide; 40 cubic meters per hour of oxygen; and 87 cubic meters per hour of a mixture of titanium tetrachloride and oxygen, 45 cubic meters per hour of this mixture being oxygen, was fed to the oxidizer 1. The oxidising reaction was effected at about 1300° C., the reaction mass is cooled in the heat exchanger 2 and there was separated 145 kilograms per hour of titanium dioxide from filter unit 3. 200 cubic meters per hour of the reaction gases were removed by the aspirator 5 and sent on to the gas meter 6 for analyses. The mixture showed 56 cubic meters per hour of carbon dioxide, 24 cubic meters per hour of nitrogen, 84 cubic meters per hour of chlorine and 17 cubic meters per hour of oxygen as well as 19 cubic meters per hour of air bringing up the oxygen amount to 21 cubic meters per hour and the nitrogen up to 39 cubic meters per hour. To this mixture was added 160 cubic meters per hour of fresh chlorine from chlorine tank 8. The rate of gas entering the chlorinator 9 thus was 360 cubic meters per hour broken down as follows:

244 cubic meters of chlorine
56 cubic meters of carbon dioxide
21 cubic meters per hour of oxygen
39 cubic meters per hour of nitrogen.

The amount of chlorine in the system having been brought up to 67%, this signifies that 785 kilograms of chlorine were fed into the chlorinator. This quantity came from the 270 kilograms of chlorine provided by the 200 cubic meters per hour of recycled gas and the 515 kilograms of fresh chlorine given by feeding in 160 cubic meters per hour of chlorine at a 100%.

In another example of the invention, there was formed a gaseous mixture the volume proportion of which corresponds to the most unfavourable conditions of direct recycling that is: chlorine 50%, carbon dioxide 18%, oxygen 9%, nitrogen 21%, nitrogen oxides 0.2%, sulphur compounds ($SO_2$, $SO_3$) 0.3%, miscellaneous 1.5%. The percentage of carbon dioxide is clearly higher than that encountered in an industrial plant. This gaseous mixture was introduced at the rate of 300 cubic meters per hour in terms of pure chlorine in a fluidised bed chlorinator having a capacity of 30 tons per day of titanium tetrachloride (when fed with practically pure chlorine). The outer surface of the chlorinator was 42 square meters and the fluidising bed had a diameter of 1.40 meters and a height of 1.40 meters.

The gaseous mixture was introduced in the base of the bed by means of a hearth which ensures its distribution.

The thermal equilibrium of the chlorinator was established at a reaction temperature of 970° C. The fluidisation occurred normally and no free chlorine was noted at the outlet of the chlorinator. The absence of chlorine at this point is very important since the presence of chlorine renders difficult the removal of vanadium from the titanium tetrachloride. This is unobvious as it would be expected in view of the large volume of gases coming out that a certain portion would consist of chlorine. The production reached 15 tons per day of titanium tetrachloride corresponding to a content of 50% of chlorine in the chlorinating gaseous charge. In the gases leaving the chlorinator, the volume ratio $$\frac{CO}{CO+CO_2}$$

was fixed at about 35%, a value only slightly different from that obtained with pure chlorine and petroleum coke. The quality of the titanium tetrachloride obtained was identical to that obtained with pure chlorine.

These examples indicate that the recycling of oxidation gases to a chlorinator is possible and makes possible the elimination of the apparatus used for recovering chlorine.

The present invention is applicable to all installations permitting the application of the described process and is not limited to the examples indicated, various modifications thereof being possible without departing from the spirit and the scope of the invention.

What is claimed is:

1. Process for making titanium tetrachloride by the auxiliary flame process by chlorinating an oxide of titanium at least in part with the chlorine produced as a by-product of the oxidation of titanium tetrachloride and mixed with oxygen and oxygen-containing gases which comprises oxidizing at high temperature a charge comprising from 40 to 150 cubic meters per hour of a mixture of carbon monoxide, carbon dioxide and nitrogen, the composition of said charge ranging from 60 to 85% of carbon monoxide, 5–15% of $CO_2$ and 5–30% of nitrogen, from 20 to 80 cubic meters per hour of oxygen and from 43 to 195 cubic meters per hour of a mixture of titanium tetrachloride and oxygen whereby said oxygen and said carbon monoxide burn to form said flame, cooling the oxidized charge, separating the titanium dioxide formed by said oxidation from the reaction gases, determining the chlorine content in said gases; adding sufficient pure chlorine gas to said gases so as to bring the concentration of chlorine gas therein within the range of 50 to 70% by volume, and feeding the gases thus enriched in chlorine to a chlorinating zone together with a reducing agent, and a titanium oxide, heating said zone at a temperature ranging from 700 to 1200° C. and recovering the titanium tetrachloride so formed.

2. Process according to claim 1, wherein the composition of said charge is about 65% CO, 5% $CO_2$ and 30% $N_2$.

References Cited

UNITED STATES PATENTS

| | | | |
|---|---|---|---|
| 2,823,982 | 2/1958 | Saladin et al. | 23—202 |
| 2,635,946 | 4/1953 | Weber et al. | 23—202 XR |
| 2,657,976 | 11/1953 | Rowe et al. | 23—87 |
| 2,701,179 | 2/1955 | McKinney | 23—87 |
| 2,721,626 | 10/1955 | Rick | 23—202 XR |
| 2,750,260 | 6/1956 | Nelson et al. | 23—202 |
| 2,779,662 | 1/1957 | Frey | 23—202 |
| 2,855,273 | 10/1958 | Evans et al. | 23—202 XR |
| 2,980,509 | 4/1961 | Frey | 23—202 |
| 3,109,708 | 11/1963 | Walmsley | 23—202 |
| 3,120,427 | 2/1964 | Mas et al. | 23—202 |

EDWARD STERN, Primary Examiner

U.S. Cl. X.R.

23—202, 260